United States Patent [19]

Gordon

[11] Patent Number: 4,749,839

[45] Date of Patent: Jun. 7, 1988

[54] WELDING TORCH GAS CUP EXTENSION

[75] Inventor: Stephen S. Gordon, Moorpark, Calif.

[73] Assignee: The United States of America as represented by the Administrator of the National Aeronautics and Space Administration, Washington, D.C.

[21] Appl. No.: 44,181

[22] Filed: Apr. 30, 1987

[51] Int. Cl.[4] .............................................. B23K 9/00
[52] U.S. Cl. .................................... 219/75; 219/137.42
[58] Field of Search ............... 219/74, 75, 136, 137.42

[56] References Cited

U.S. PATENT DOCUMENTS

| | | | |
|---|---|---|---|
| 2,612,584 | 9/1952 | Morrissey | 219/75 |
| 2,876,334 | 3/1959 | Wojciak et al. | 219/137.42 |
| 3,128,370 | 4/1964 | Meyer | 219/137.42 |
| 3,436,522 | 4/1969 | Carkhuff et al. | 219/74 X |
| 4,300,034 | 11/1981 | Schneider et al. | 219/75 |

Primary Examiner—E. A. Goldberg
Assistant Examiner—C. M. Sigda
Attorney, Agent, or Firm—Leon D. Wofford, Jr.; John R. Manning; William J. Sheehan

[57] ABSTRACT

A gas cup extension assembly (10) is mounted on a standard electric welding torch gas cup (11) to enable welding in areas with limited access. The gas cup assembly (10) has a tubular insert (14) that fits within the gas cup (11) but extends a lower externally threaded portion (17) downward through the gas cup exit opening. A tubular extension (18) is screwed onto the threaded portion (17) so as to be placed tight against the lower edge of the gas cup (11). The upper portion (20) of the extension has a rim (21) to define the outer perimeter of the seat edge about the entrance opening so a gasket (24) may be placed to effect an air tight seal between the tubular insert (14) and tubular extension (18). The tubular extension (18) will have its lower portion (19) shaped as desired for the particular welding activity and may easily be replaced with another extension having a different shaped lower portion.

9 Claims, 1 Drawing Sheet

WELDING TORCH GAS CUP EXTENSION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

TECHNICAL FIELD

This invention relates to a gas shielded electric arc welding torch having a gas cup and more particularly to an extension for the gas cup. The gas cup extension is detachable from the normal electrode welding torch gas cup and may be of any desired configuration or length.

BACKGROUND ART

A recurrent problem in gas shielded electric arc welding is a need to machine special shaped gas cups or extensions. These extensions allow welding in areas which would otherwise be inaccessible because the standard gas cup is too large or not long enough. The extensions most often are made of metal and are slipped onto or fit into the existing gas cup. They are usually bent into shape and plasma sprayed with an insulated coating. But plasma sprayed coatings causes problems when they flake and chip off leaving the exposed base metal which permits an electric arc to cross over to the workpiece and ruin the weld. Also, the flakes and chips may fall directly into the weld and ruin it.

These gas cup extensions were of the slip-on or fit-in type which tended to become loose with usage and often failed to have a good seal with the gas cup with the result that they would move and/or draw in air during welding. Also the previous extensions when designed for a particular direction of welding would need shims to properly align it and they would easily become misaligned when it became loose from the standard gas cup.

STATEMENT OF THE INVENTION

A gas cup extension assembly has been developed that offers welders a degree of flexibility in choosing a suitable extension which can easily be attached to the standard welding torch. The extension assembly consists of a tubular screw piece, having external threads on its lower end portion, that is placed into the gas cup so its external threads protrude from the end of the gas cup, and a tubular extension which can be of any desired shape and length but having an upper portion with internal threads and an internal shoulder that permits the extension to be screwed onto the threads of the tubular screw piece and tighten against the end of the standard gas cup. A gasket is used to effect an airtight seal between the end of the gas cup and internal shoulder. The tubular extension may be made of metal or ceramic material that can be machined.

Accordingly, it is an object of the present invention to provide a detachable gas cup extension assembly for the standard gas cup of an electric arc welding torch which is tightly sealed to the gas cup.

Another object is to provide a detachable extension to a gas cup of an electrode arc welding torch which permits the use of a plurality of extensions which may be of different configurations and materials and yet fit the standard gas cup.

DETAILED DESCRIPTION OF THE INVENTION

Figure 1:
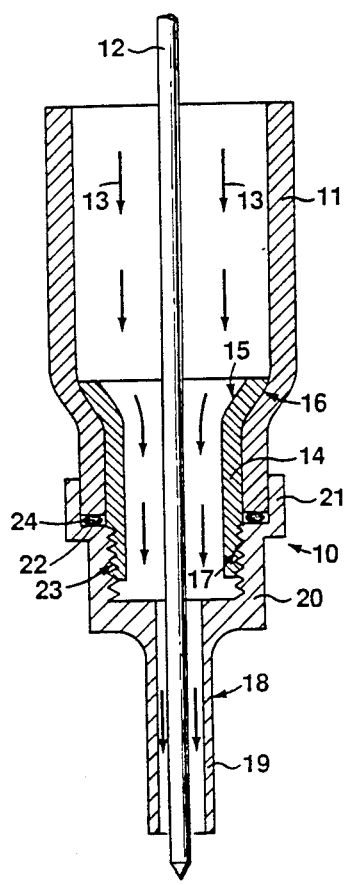
FIG. 1 is a sectional view showing the gas cup extension assembly on a standard gas cup of an electric arc welding torch.

Referring to the drawings, FIG. 1 is a sectional view of the gas cup extension assembly 10 mounted on a standard gas cup 11 of an electric arc welding torch having a center electrode 12. Cover gas flow, indicated by arrows 13, form a gas shield to prevent atmospheric contamination of the electrode, the weld puddle, and adjacent heated areas during the welding operations. The extension assembly consists as shown of a tubular insert 14 having an outer diameter corresponding to the inner diameter of the narrow end portion of the standard gas cup 11, and having an upper flared out portion 15 which conforms to the inward slope 16 of the inner surface of standard gas cup 11. The lower portion of the tubular insert 14 projects from the gas cup 11 and has threads 17. Screwed onto the threaded portion 17 of the insert 14 is the extension 18 that is shaped as desired for the welding operations.

The extension 18 is shown as a tubular member having a lower portion 19 that is rectangular and narrow as opposed to its upper portion 20 which is cylindrical. The top of the upper portion 20 has a cylindrical rim 21 which has an inner diameter corresponding to the outer diameter of the end of the standard gas cup 11 and which forms a shoulder 22 about the entrance to the inner opening of the upper portion 20. As shown in the sectional view of FIG. 1, a portion 23 of the inner surface of the opening adjacent the entrance is threaded and screwed onto the threads 17 of the tubular insert 14 so as to place the extension 18 tight against the end of the gas cup. An annular gasket 24 is seated between the end of the gas cup 11 and the entrance edge or shoulder 22 of the extension 18 to form an airtight seal. The gasket 24 may be made of Teflon or any other heat resistant gasket material.

The extension 18 may be machined from ceramic material for good electrical insulation and thus avoid the use of metal with a plasma coating which can be troublesome. While a configuration is shown for the extension 18 that is useful for reaching a joint on the main combustion chamber of the Space Shuttle Main Engine, it is just one of many configurations that could be useful. The extension 18 could incorporate gas trailing shields.

Figure 2:
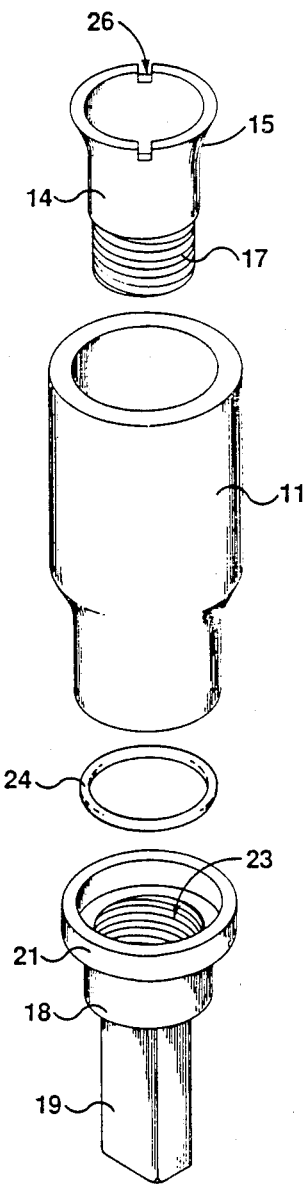
FIG. 2 is a disassembled view of the gas cup assembly.

FIG. 2 shows the extension assembly disassembled but with the proper relationship for insert 14, gasket 24, and extension 18 relative to the gas cup 11. The upper edge of the insert 14 has notch or slot 26 along a diameter line so a tool with flat edge (not shown) may be inserted therein to rotate insert 14 for screwing its threads 17 into the threaded portion 23 of the extension 18 or for holding the insert 14 from rotation as the extension 18 is screwed onto the threaded portion. As is now apparent, another extension (not shown) with a different lower portion could easily replace the extension 18 by using the same insert 14 already in the gas cup 11.

While the extension assembly has been described relative to a specific embodiment, it is evident that modifications and changes may be made thereto without departing from the scope of the invention as defined by the claims.

What is claimed is:

1. In an electric arc welding torch having a gas cup and an electrode axially extending through an internal passageway defined by a surrounding internal wall of said gas cup, said internal surrounding wall having a lower portion that narrows to form an exit opening and said gas cup directing a cover gas flow through said internal passageway and out through said exit opening to prevent atmospheric contamination of the welding operations, said exit opening having a size which allows an annular space about said axially extending electrode, said gas cup having an edge surface about said exit opening, the improvement comprising:
   a tubular fastener piece loosely fitted within said internal passageway of said gas cup and having a lower portion extending through and below said exit opening,
   said tubular fastener piece having an internal pasageway axially aligned with said electrode and of a size that allows an annular space about said electrode,
   said tubular fastener piece having an upper portion larger than said exit opening so it will be held within the internal passageway of said gas cup,
   a tubular extension having an internal passageway axially aligned with said electrode and of a size that allows an annular space about said electrode,
   said tubular extension having an upper edge surface about its internal passageway which is contiguous to said edge surface about said exit opening,
   a heat resistant annular gasket between the upper edge surface of said tubular extension and the edge surface about said exit opening,
   said tubular fastener piece and said tubular extension having cooperating means for telescoping the two together so as to clamp said upper portion of tubular fastener piece to said surrounding internal wall of said gas cup, and to clamp the upper edge surface of said tubular extension and the edge surface about said exit opening to said annular gasket, and for detaching the two from each other so as to replace said tubular extension with one of a different configuration.

2. In an electric welding torch according to claim 1, further comprising:
   said cooperating means for telescoping together said tubular fastener piece and said tubular extension are cooperating screw threads on said tubular extension and on the lower portion of said tubular fastener piece.

3. In an electric welding torch according to claim 1, further comprising:
   said tubular extension having an upper outer rim extending from its upper edge surface and past said annular gasket so as to overlap said gas cup.

4. In an electric welding torch according to claim 3, further comprising:
   said internal passageway of said gas cup being cylindrical.

5. In an electric welding torch according to claim 2, further comprising:
   the internal passageway of said tubular extension being defined by an internal surrounding wall having an upper portion adapted to telescope over the lower portion of said tubular fastener piece,
   said cooperating screw threads on said tubular extension being on said upper portion of said surrounding internal wall of said tubular extension.

6. An electric arc welding torch, comprising:
   a gas cup with an internal passageway defined by an internal wall of said gas cup, said internal wall having a lower portion that narrows to form an exit opening, said gas cup directing a cover gas flow through said internal passageway and out through said exit opening to prevent atmospheric contamination of the welding operations,
   said gas cup having an edge surface about said exit opening,
   a tubular fastener piece loosely fitted within said internal passageway of said gas cup and having a lower portion extending through and below said exit opening,
   said tubular fastener piece having an upper portion larger than said exit opening so it will be held within the internal passageway of said gas cup, and having an internal passageway axially aligned with the internal passageway of said gas cup,
   a tubular extension having an internal passageway axially aligned with the internal passageway of said gas cup and the internal passageway of said tubular fastener piece,
   said tubular extension having an upper edge surface about its internal passageway which is contiguous to said edge surface about said exit opening of the gas cup,
   a heat resistant annular gasket between said upper edge surface of said tubular gasket and said edge surface about said exit opening of the gas cup,
   cooperating screw threads on said lower portion of said tubular fastener piece and said tubular extension for telescoping together said tubular fastener piece and said tubular extension so as to clamp said upper portion of said tubular fastener piece to said internal wall of said gas cup and to clamp said upper edge surface of said tubular extension and said edge surface about said exit opening to said annular gasket, and for detaching said tubular fastener piece and said tubular extension so as to replace said tubular extension with one of a different configuration.

7. An electric welding torch according to claim 6, further comprising:
   said tubular extension having an upper outer rim extending from its upper edge surface and past said annular gasket so as to overlap said gas cup.

8. An electric welding torch according to claim 6, further comprising:
   said internal wall of said gas cup being cylindrical,
   an electrode extending axially through said internal passageways of said gas cup, said tubular fastener piece, and said tubular extension.

9. An electric welding torch according to claim 6, further comprising:
   the internal passageway of said tubular extension being defined by an internal surrounding wall having an upper portion adapted to telescope over the lower portion of said tubular fastener piece,
   said cooperating screw threads on said tubular extension being on said upper portion of said internal surrounding wall of said tubular extension.

* * * * *